United States Patent [19]

Perry et al.

[11] Patent Number: 4,807,568
[45] Date of Patent: Feb. 28, 1989

[54] SHOULDER DRAPED BIRD PERCH

[76] Inventors: Ronald E. Perry, 19 Delaware Ave., Bath, N.Y. 14810; Timmy D. Baumgardner, 19601 N. 7th St., Apt. 1065, Phoenix, Ariz. 85024

[21] Appl. No.: 6,787

[22] Filed: Jan. 27, 1987

[51] Int. Cl.⁴ ............................................. A01K 31/12
[52] U.S. Cl. ...................................................... 119/26
[58] Field of Search ....................... 119/23, 24, 26, 49; 428/91, 95; 54/44, 37; 2/46

[56] References Cited

U.S. PATENT DOCUMENTS

| 2,660,347 | 2/1950 | Finney | 224/205 |
| 3,698,608 | 10/1972 | Entwistle | 54/44 X |
| 4,050,099 | 9/1977 | David | 2/46 |
| 4,187,337 | 2/1980 | Romageon | 428/95 |
| 4,285,067 | 8/1981 | David | 2/46 |
| 4,350,726 | 9/1982 | Berry, Jr. | 428/95 |
| 4,579,764 | 4/1986 | Peoples, Jr. et al. | 428/95 |

Primary Examiner—Robert Peshock
Assistant Examiner—R. Thomas Price
Attorney, Agent, or Firm—James F. Duffy

[57] ABSTRACT

A shoulder draped bird perch includes a shoulder conformable, covered base which is set on a person's shoulder. The base covering is claw graspable and protects the person from claw induced injury and soiling by bird droppings. Anti-slip surfaces cooperate to retain the perch on a person's shoulder.

11 Claims, 1 Drawing Sheet

SHOULDER DRAPED BIRD PERCH

DESCRIPTION

1. Technical Field

The invention relates to a bird perch which may be draped across the shoulder of a person for transporting a bird thereon. The invention relates to means for transporting a bird on the shoulder of a person while providing a secure perch for the bird thereon and protecting the person's clothing from damage by the claws of the bird or from soil due to bird droppings.

2. Background Art

Many persons who maintain birds train the birds to perch on their shoulders there to be transported about the premises. This practice subjects the person to the danger of having their clothes soiled by bird droppings. In instances wherein larger birds, such as parrots, are transported on the shoulder, the bird's claws may damage the persons clothing and, indeed, may cause pain to the person as the bird, attempting to maintain its position on an unstable perch, digs its claws into the person's shoulder.

The prior art has disclosed a shoulder protection device for protecting the clothing of a person when "burping" a baby. This art is exemplified in the patents to David, U.S. Pat. Nos. 4,050,099 and 4,285,067. These shoulder protective devices are maintained in position by means of ties or hook and loop fasteners.

A shoulder draped receptacle is disclosed by Finney in U.S. Pat. No. 2,660,347. This shoulder draped receptacle, for use by beauticians is maintained in place by means of lead weights disposed in pockets at the extremity of the shoulder draping. The shoulder draped receptacle is intended for use by a relatively immobile person such as the beautician or the beautician's client while the client's hair is dressed.

No known prior art provides a shoulder draping on which a bird may securely perch while the person wearing the draping has freedom of movement. It is therefore an objective of the invention to provide a shoulder draped bird perch which may be worn by a person without the need for extraneous ties and strappings to the person's clothing.

It is a further objective of the invention to provide a shoulder draped bird perch which will provide a bird a secure perch on a a person's shoulder without risk of damage to the person's clothing or the person's shoulder.

DISCLOSURE OF THE INVENTION

The invention disclosed herein is a shoulder draped bird perch for transporting a bird on the shoulder of a person utilizing the perch. The perch is comprised of a clawgrasping obverse surface securely graspable by the claws of a bird to be placed on the perch. An anti-slip reverse surface is provided for maintaining the perch securely in position on the shoulder of a person utilizing the perch. In a preferred embodiment of the invention the obverse surface is comprised of a fabric having a nap which may be readily grasped by the claws of a bird. For sanitary reasons this fabric may be laundered. To further assist in maintaining the perch in position on the shoulder of a person a semi-rigid, hand-formable base is provided. This base is conformable to the shoulder contours of the person utilizing the perch and is coupled between the obverse and reverse surfaces of the perch.

The invention may be restated as a shoulder draped bird perch for transporting a bird on the shoulder of the person utilizing the perch and comprising a claw graspable fabric for draping over the shoulder of a person to provide a perch on the person's shoulder and to protect the person's clothing from tearing by the bird's claws and from soil from bird droppings. Anti-slip means are coupled to the fabric to retain the fabric on the shoulder of the person using the perch. As before, a hand-conformable base is coupled between the fabric and the anti-slip means for conforming the perch to the shoulder contours of the person and for further retaining the fabric on the shoulder of that person.

A further restatement of the invention would summarize it as a shoulder draped bird perch for transporting a bird on the shoulder of a person utilizing the perch and comprising a claw graspable fabric for draping over the shoulder of a person, the fabric having a length to extend from above the breast of the person to a position below the shoulder of that person. A hand-formable base is removably coupled to the fabric for conforming the fabric to the contour of the person's shoulder. Anti-slip means are coupled to the base for retaining the base to the shoulder of that person. In one embodiment of this invention hook and loop fasteners are employed for coupling the fabric to the base.

BEST MODE FOR CARRYING OUT THE INVENTION

Figure 1:
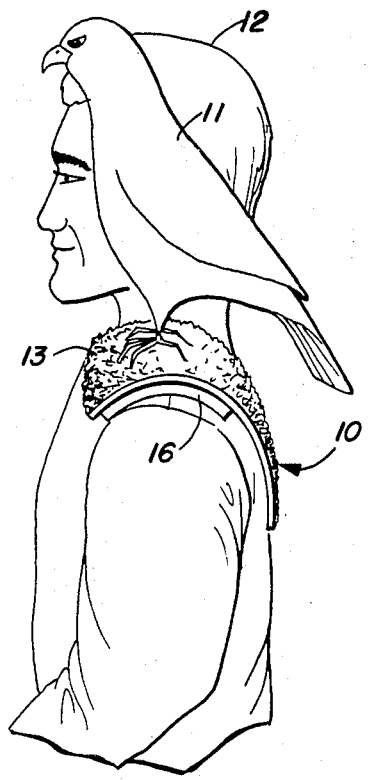
FIG. 1 illustrates the shoulder draped bird perch in use on the shoulder of a person with a bird reposed on the perch.

For the purposes of promoting an understanding of the principles of the invention, reference will now be made to embodiments illustrated in the drawings and specific language will be used to describe the same. It will, nevertheless, be understood that no limitation on the scope of the invention is thereby intended, such alterations and further modifications in the illustrated device, and such further applications of the principles of the invention as illustrated therein being contemplated as would normally occur to one skilled in the art to which the invention relates.

In FIG. 1, the shoulder draped bird perch is generally designated by the reference 10. In FIG. 1 a bird 11 is perched on the shoulder draped perch 10. The perch is worn by a person 12. The bird is enabled to securely grasp the cover 13 of perch 10. The ability of the secure perch enables the person 12 to move about without alarming the bird 11.

Figure 2:
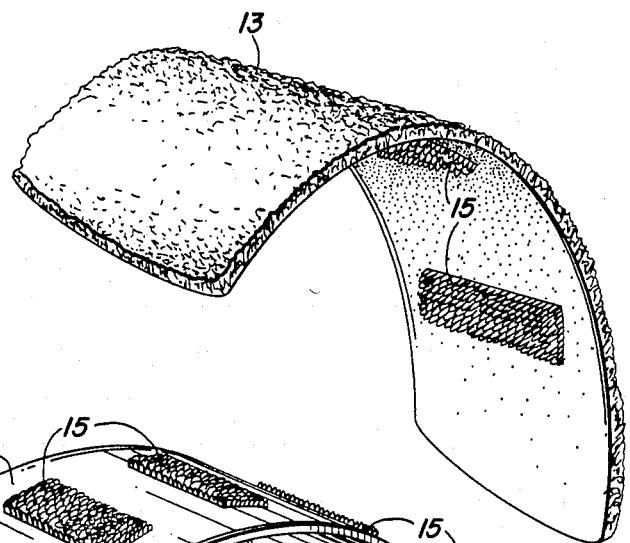
FIG. 2 is an exploded assembly, in perspective, of the elements of the shoulder mounted bird perch.
Figure 2:
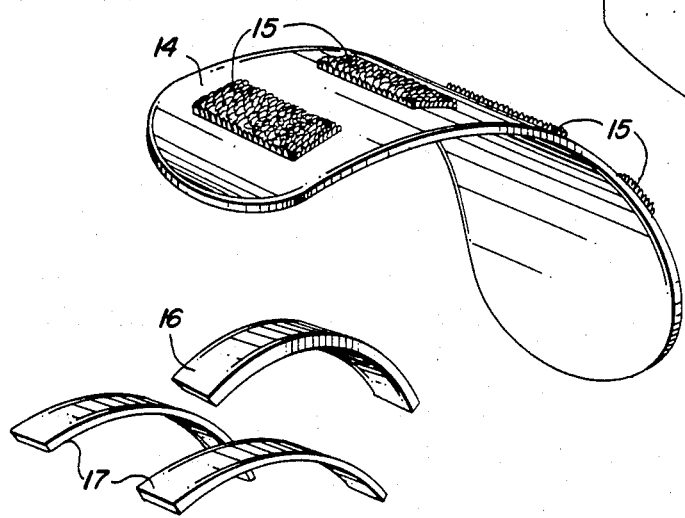

In FIG. 2 is seen, in an exploded assembly, a working embodiment of the invention. The bird perch cover 13 is provided with a surface which is graspable by the claws of bird 11. A fabric with a short nap would provide this characteristic. The weave of the fabric of cover 13 could also provide this characteristic.

A hand-formable base 14 is removably coupled to cover 13 by means of hook and loop fasteners 15. Base 14 is hand-formable so as to permit it to be conformed to the contours of the shoulder of person 12. This contour adjustment aids in retaining bird perch 10 on the shoulder, of person 12. Cover 13 is readily removable from base 14 so that it may be laundered.

In those instances in which perch 10 tends to slide from the shoulder of the person wearing the perch, a riser 16 may be emplaced to raise one end of perch 10 to overcome the sloping effect of the person's shoulder.

An anti-slip surface is applied to the lower portion of perch 10. The anti-slip surface comes in contact with the clothing worn above the shoulder of the person. For purposes of illustration, this anti-slip means is illustrated as rubber strips 17.

Figure 3:
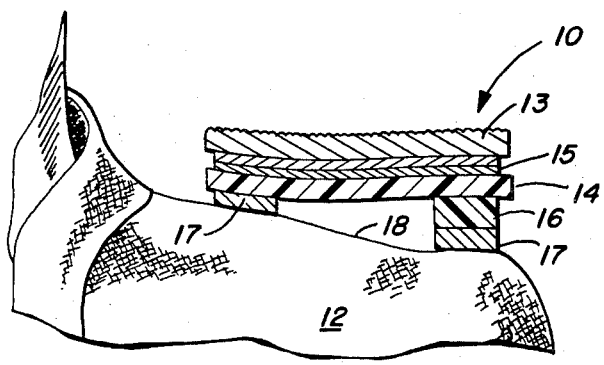
FIG. 3 is a sectional view of the shoulder mounted bird perch and placed upon a person's shoulder.

In the cross sectional view of the perch 10, illustrated in FIG. 3, the working embodiment of the invention disclosed is seen to comprise cover 13 coupled to hand-formable base 14 by means of hook and loop fasteners 15. Anti-slip means 17 prevent perch 10 from sliding from a person's shoulder 18 when the person wears the perch. In the illustration of FIG. 3 a riser 16 is shown employed to overcome the effect of a sloping shoulder.

To utilize perch 10, a person places the perch on the shoulder such that the cover fabric 13 extends in the front just above the person's breast. The extremity of cover 13 extends approximately midway down the person's back. This added length at the back of cover 13 provides a protective covering for the person's clothing to prevent the clothing from being soiled by bird droppings. Since cover 13 is readily removable from base 14, it may be laundered as the need arises.

The surface characteristics of cover 13 enable bird 11 to readily grasp the cover 13 and to find a secure perch thereon. The combination of cover 13 and base 14 provides a protective armament to prevent the claws of bird 11 from impinging upon the fleshy portions of the person's shoulder and potentially causing pain thereto.

What has been disclosed is a shoulder draped bird perch. A shoulder conformable, covered base is set on a person's shoulder. The base covering is claw graspable and protects the person from claw-induced injury and soiling by bird droppings. Anti-slip means cooperate to retain the perch on a person's shoulder.

Those skilled in the art will recognize other embodiments of the invention which may be drawn from the illustrations and the teachings herein. To the extent that such alternate embodiments are so drawn, it is intended that they shall fall within the ambit of protection of the claims appended hereto.

Having disclosed our invention in the foregoing specification and accompanying drawings in such clear and concise manner that those skilled in the art will readily understand and easily practice the invention, that which we claim is:

1. A shoulder draped bird perch for transporting a bird on the shoulder of a person utilizing the perch comprising:
   a claw graspable obverse surface securely graspable by the claws of a bird to be placed on said perch;
   an anti-slip reverse surface for maintaining said perch securely in position on the shoulder of the person utilizing said perch and riser means coupled to said reverse surface to raise said perch to offset the slope of the user's shoulder.

2. The bird perch of claim 1 wherein said obverse surface is comprised of a fabric having a nap readily graspable by the claws of a bird.

3. The bird perch of claim 2 wherein said fabric is a launderable fabric.

4. The bird perch of claim 2 further comprising a semi-rigid hand-formable base, conformable to the shoulder of the person utilizing said perch, coupled to and between said obverse and said reverse surfaces of said perch.

5. The bird perch of claim 1 further comprising a semi-rigid hand-formable base, conformable to the shoulder of the person utilizing said perch, coupled to and between said obverse and said reverse surfaces of said perch.

6. The bird perch of claim 5 wherein said obverse surface is comprised of a fabric having a nap readily graspable by the claws of a bird.

7. A shoulder draped bird perch for transporting a bird on the shoulder of a person utilizing the perch comprising:
   a claw graspable fabric for draping over the shoulder of a person to provide a bird a perch on said shoulder and to protect the clothing of the person from tearing by bird's claws soil from bird droppings; and
   anti-slip means coupled to said fabric retaining said fabric on the shoulder of a person and riser means coupled to said fabric to raise said perch to offset the slope of the user's shoulder.

8. The bird perch of claim 7 further comprising a hand-conformable base coupled between said fabric and said anti-slip means for conforming said bird perch to the shoulder contours of a person and further retaining said fabric on the shoulder of a person.

9. A shoulder draped bird perch for transporting a bird on the shoulder of a person utilizing the perch comprising:
   a claw graspable fabric for draping over the shoulder of a person said fabric having a length to extend from above the breast of a person to position below the shoulder of a person;
   a hand-formable semi-rigid base capable of retaining a desired configuration and removably coupled to said fabric for conforming said fabric to the contour of a person's shoulder; and
   anti-slip means coupled to said base for retaining said base on the shoulder of a person.

10. The bird perch of claim 9 further comprising hook and loop fasteners coupling said fabric and said base.

11. A shoulder draped bird perch for transporting a bird on the shoulder of a person utilizing the perch comprising:
    a claw graspable obverse surface securely graspable by the claws of a bird to be placed on said perch;
    an anti-slip reverse surface for maintaining said perch securely in position on the shoulder of the person utilizing said perch; and
    a semi-rigid base, hand-formable by a person using said perch into a desired configuration such that said base conforms to the contours of the shoulder of a user to retain said perch on a user's shoulder, said semi-rigid base being coupled to and between said obverse and said reverse surfaces of said perch.

* * * * *